Oct. 1, 1946.  A. M. ROSSMAN  2,408,448
TWO CYCLE ENGINE
Filed April 8, 1944
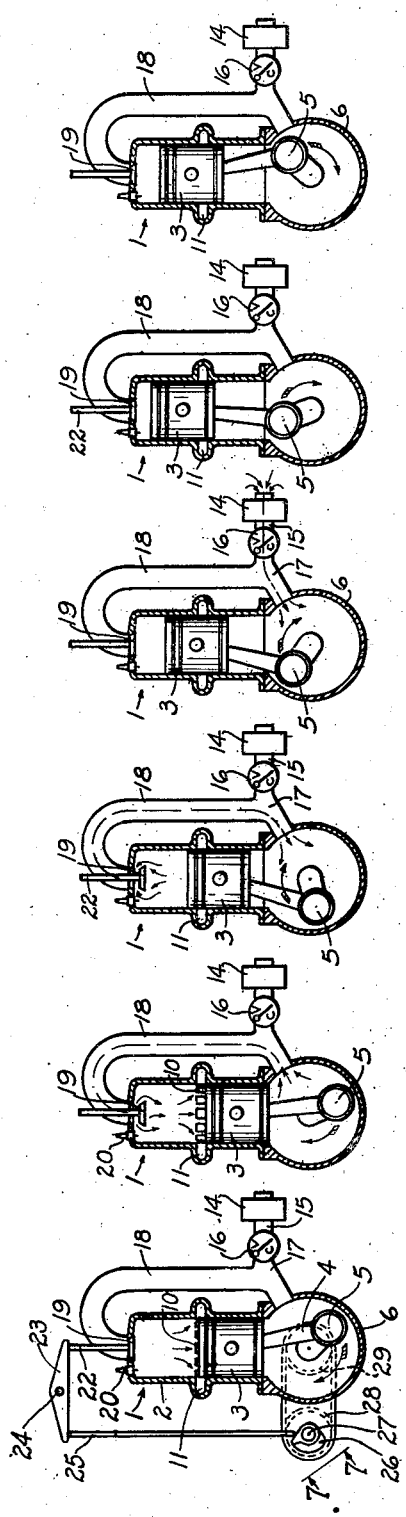
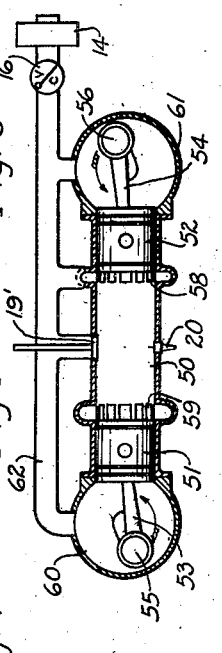
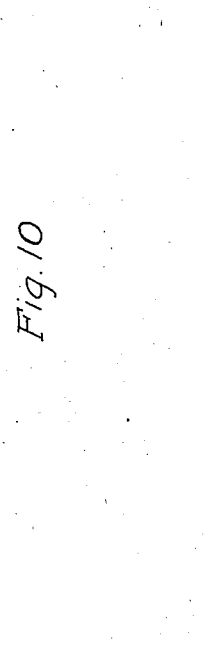
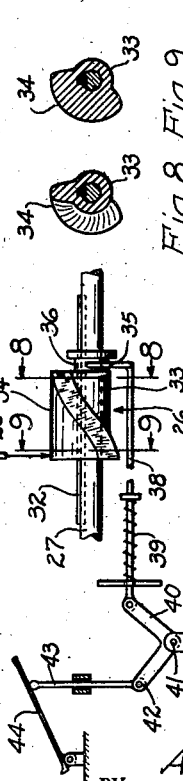
INVENTOR.
Allen M. Rossman
BY Morris Spector Patented Oct. 1, 1946

2,408,448

UNITED STATES PATENT OFFICE 2,408,448

TWO-CYCLE ENGINE

Allen M. Rossman, Wilmette, Ill.

Application April 8, 1944, Serial No. 530,199

3 Claims. (Cl. 123—73)

This invention relates to two stroke cycle engines. In the usual type of two stroke cycle engine the exhaust ports are uncovered by the piston at the end of its stroke, whereupon exhaust takes place and the pressure in the cylinder drops to atmospheric pressure. Shortly thereafter, and when the exhaust ports are still open, a charge consisting of a mixture of air and fuel is admitted into the cylinder, that mixture serving to scavenge the products of combustion of the previous cycle of the engine. The mixture which is thereafter to be compressed consists of the charged fuel plus such amount of the previously ignited fuel as remained in the cylinder. When the engine is operating under a very light load the mixture that is introduced into the cylinder is so little that when it is diluted with the products of combustion from the previous cycle difficulty is encountered in igniting it. It is one of the objects of the present invention to avoid this difficulty. This is accomplished, in the preferred embodiment of the present invention, by providing an arrangement wherein the quantity and degree of richness of the gas and air mixture introduced into the cylinder during the scavenging action is constant regardless of whether the engine is operating under full load or very light load. This assures the same type of scavenging action under light load as takes place under full load. After the scavenging action has taken place and upon commencement of the return stroke of the piston, a valve which controls the passageway of fuel-air mixture to the cylinder is maintained open so that some of the charge of the cylinder is returned to the compressor. Thereafter this valve is closed and upon continued movement of the piston in the cylinder compression takes place in the usual manner. The point of closure of the valve, with respect to the position of the piston, determines the amount of charge left in the cylinder, thereby determining the load that is carried by the engine. Thus in accordance with the preferred embodiment of the present invention a fixed charge is introduced into the cylinder at each cycle, to effect the necessary scavenging action, and then a part of the charge is removed from the cylinder in an amount determined by the load on the engine. By this arrangement the mixture being ignited is not excessively diluted by the previously burned gases even when the engine is operating under very light load.

The attainment of the above and further objects of the present invention will be apparent from the following specification taken in conjunction with the accompanying drawing forming a part thereof.

In the drawing:

Figure 1 is a diagrammatic view of an engine embodying the present invention showing the piston in its position at the commencement of the exhaust;

Figure 2 is a view similar to Figure 1 showing the piston at the commencement of the scavenging action;

Figures 3, 4, 5 and 6 show successive positions of the piston of the engine of Figure 1 during the actions of uncharging, compressing, igniting and expanding, respectively;

Figure 7 is a diagrammatic sectional view taken along the line 7—7 of Figure 1 and illustrating the cam control;

Figures 8 and 9 are sectional views taken along the lines 8—8 and 9—9 of Figure 7; and Figure 10 is a diagrammatic view illustrating the principles of the present invention as applied to an opposed piston type of two stroke cycle engine.

Reference may now be had more particularly to Figure 1. In this figure a gas engine 1 has a cylinder 2 therein within which a piston 3 reciprocates, said piston having a connecting rod 4 connecting it with a rotary crank shaft 5 within a crank case 6. The cylinder 2 has a ring of exhaust ports 10 formed in the wall thereof and extending around the entire 360° of its circumference, which open into a discharge passageway 11 that opens to the atmosphere. The ports 10 are uncovered by the piston slightly before the end of the power stroke thereof, which is the position illustrated in Figure 1, and remain uncovered as the crank and connecting rod pass through dead center. The crank case 6 is sealed and forms a precompression chamber for the fuel-air mixture to drive the engine.

The crank case receives a fuel-air mixture from a carburetor 14 through a conduit 15, a check valve 16 and a conduit 17. The check valve 16 is normally closed to the conduit 15 and opens when the pressure in the crank case becomes sub-atmospheric. The crank case also communicates with the engine cylinder 2 through a conduit 18 controlled by a valve 19. A spark plug 20 in the cylinder head controls the ignition of the gas-air mixture.

The engine thus far described is a standard two stroke cycle gas engine. One way of governing engines of this type, in the past, was by throttling; another way by controlling the richness of the fuel-air mixture. This is dispensed with in the present engine. The novel feature of the present engine lies in the manner of governing, whereby instead of throttling or of governing the richness of the mixture, the entire governing action is obtained by control of the valve 19.

The valve 19 is spring closed and is opened by a valve stem 22 actuated by an arm 23 pivoted at 24 and controlled by a cam rod 25 that is actuated by a cam 26 splined on a shaft 27, which shaft is rotated by the crank shaft 5 in any desired manner, as, for instance, by a chain drive between a gear 28 keyed to the shaft 27 and a gear 29 keyed to the crank shaft.

An explanation will now be given of the action of the cam 26 on the cam rod 25. The cam 26 is splined to the shaft 27 as by a key 32 so that the cam can slide longitudinally on the shaft within limits but cannot turn thereon. The cam has a cylindrical portion 33 and a helically shaped elevated portion 34. When the cam follower of the cam rod 25 is on the portion 33 of the cam the valve is shut. When the follower rides onto the elevated portion 34 of the cam it opens the valve. The elevated portion 34 is of uniform radius and of different circumferential length at different positions on the cam. The position of the cam with respect to the cam follower at the end of the cam rod 25 is controlled by a U-shaped yoke 35 which embraces and extends into a groove 36 in the cam 26. The yoke 35 is rigid at the end of a rod 38 which is actuated in one direction by a compression spring 39 and in the other direction by a crank 40 pivoted at 41 and having a pivotal connection at 42 to a longitudinally movable rod 43 that is actuated by a foot pedal or lever 44. The angular extent of the elevated portion 34 opposite the follower 25 determines the duration of the open period of the valve 19. By shifting the cam 26 along the shaft 27 this period may be decreased at will.

An explanation will now be given of the mode of operation of the engine thus far described. As the piston approaches the end of its power stroke, at the position illustrated in Figure 1, it uncovers the ring of exhaust ports 10 and enough of the spent gases escape from the cylinder to drop the pressure therein approximately to atmospheric pressure. Upon continued downward movement of the piston to the position illustrated in Figure 2, which is approximately but not quite at the end of the downward stroke of the piston, the exhausting action has almost been completed and the valve 19 opens. This permits a charge of a gas-air mixture to flow from the crank case through the conduit 18 and the open valve 19 into the cylinder, as illustrated in Figure 2. This precompressed charge of fuel-air mixture is of a volume equal to the piston displacement, as will be presently described. The charge sweeps the remainder of the spent gases in the cylinder ahead of it out through the exhaust ports at the far end of the cylinder and leaves the cylinder full of a combustible mixture at atmospheric pressure. During all of this time the check valve 16 has remained closed. As the piston moves upwardly it covers the exhaust ports 10. This completes the scavenging action illustrated in Figure 2. As the piston continues to move in the cylinder in the position illustrated in Figure 3, the valve 19 remains open at all loads less than the maximum. The movement of the piston causes a return flow of the fuel-air mixture from the cylinder through the valve 19 to the crank case. The valve 19 is remote from the exhaust ports, hence the gas-air mixture that is returned to the crank case is least, if at all, diluted by mixing with previously burned gases in the engine cylinder. This uncharging continues, during the upward movement of the piston, until the charge of the combustible mixture in the cylinder has been reduced to the volume required to carry the load, at which time the valve 19 closes. This is illustrated in Figure 4. From then on continued upward movement of the piston compresses the residue of the gases in the cylinder. The upward movement of the piston now reduces the pressure in the crank case and causes the check valve 16 to open to draw in a charge of gas-air mixture through the check valve and carburetor 14. This continues throughout the compression period. Towards the end of the compression period, when the piston is approximately in the position illustrated in Figure 5, the spark plug 20 ignites the compressed fuel-air mixture. Then follows the expansion or power stroke illustrated in Figure 6.

During this power stroke the downward movement of the piston compresses the fuel-air mixture in the crank case. The check valve 16 immediately closes. The volume decrease by compression is, of course, equal to the piston displacement. The charge accumulated in the compressor, which comprises the crank case, is made up of that portion of the combustible mixture that was returned from the cylinder, plus such a volume of fresh mixture drawn in through the carburetor as is required to make the total volume equal to the piston displacement.

The principles of the present invention are also applicable to an opposed piston engine. This is illustrated in Figure 10 wherein there is provided a cylinder 50 having reciprocating pistons 51—52 at opposite ends thereof connected by connecting rods 53—54 to crank shafts 55—56. At one end of the cylinder there is provided a series of intake ports 58 and at the other end a series of exhaust ports 59. These ports extend around the entire 360° of the circumference of the cylinder wall and are of the same general construction as the ports 10 of the engine previously described. The piston 52 controls the covering and uncovering of the intake ports 58 whereas the piston 51 controls the covering and uncovering of the exhaust ports 59. The arrangement is such that the piston 51 opens the exhaust ports 59 in advance of the openings of the intake ports 58. Towards the end of the power stroke the piston 51 opens the exhaust ports. Enough of the spent gases escape to drop the pressure in the cylinder to approximately atmospheric pressure. Thereafter the piston 52 uncovers the intake ports and a precompressed charge of a gas-air mixture from the two crank cases 60—61 flows through a conduit 62 to the intake ports. The fresh charge of fuel-air mixture flowing through the ports 58 sweeps the remaining burned gases from the cylinder ahead of it out through the exhaust ports 59. A valve 19', controlled in the same manner as is the valve 19 of Figure 1, controls the release of some of the charge of the cylinder at all loads less than the maximum. During the return movement of the pistons 51—52, after the piston 51 has closed the ports 59, the valve 19' opens at all loads less than the maximum and remains open during a part of the piston stroke so that a portion of the combustible mixture is returned from the cylinder back through the connection 62 to the compressors comprising the two crank cases from which the charge came. During that time the check valve 16 remains closed, thus closing the connection from the carburetor to the conduit 16. After the combustible mixture in the cylinder has been reduced to the volume that is required to carry the load the valve 19' closes, and compression in the cylinder commences. At the same time the suction created in the crank cases by the movement of the pistons causes the check valve 16 to open and draw air into the carburetor, and the combustible mixture to pass from the carburetor through the valve 16 into the crank cases. It is believed that the action of the engine illustrated in Figure 10 will be readily understood from the description previously given of the single piston engine.

In compliance with the requirements of the patent statutes I have here shown and described a preferred embodiment of my invention. It is, however, to be understood that the invention is not limited to the precise construction here shown, the same being merely illustrative of the principles of the invention. What is considered new and desired to be secured by Letters Patent is:

1. A two stroke cycle engine having a cylinder and a piston reciprocable therein, a fuel-air supply chamber for the cylinder, means for filling the chamber with a fixed amount of fuel-air mixture at a constant pressure during each cycle of operation of the engine, means for extracting a variable quantity of fuel-air mixture from the cylinder during each cycle of operation of the engine, said last named means comprising a passageway from the cylinder to the chamber, a valve controlling the flow of fuel-air mixture from the cylinder to said chamber, variable-cam means controlled by movement of the piston for opening the valve during a portion of the movement of the piston in its compression direction in each cycle of operation of the piston, and manually operable means operable during operation of the engine for shifting the cam means to vary the point of closure of said valve with respect to the motion of the piston.

2. A two stroke cycle internal combustion engine having a cylinder, a reciprocable piston therein, a crank case, means forming a fuel-air intake passageway to the crank case, said passageway having therein a check valve which opens responsive to a reduction of pressure in the crank case below atmospheric pressure and closes responsive to the establishment of at least atmospheric pressure in the crank case whereby the piston movement in one direction creates a vacuum in the crank case to open the check valve and draw a fuel-air mixture into the crank case and upon reverse movement the piston acts to compress the mixture, means forming a fuel-air passageway from the crank case to the cylinder, and means for governing the engine by returning to the crank case of the engine a variable part of the fuel-air mixture from the cylinder during each cycle of operation of the piston, said governing means including a valve, means controlled by the position of the piston during each cycle of its operation for operating the valve, and manually operable means operable during operation of the engine for varying the timing of the last named means with respect to the piston motion.

3. In combination with an internal combustion engine having a cylinder and a piston reciprocable therein, an exhaust valve, a fuel-air chamber, means for filling the chamber with a fixed amount of fuel-air mixture at a constant pressure during each cycle of operation of the engine, a communication connection between the chamber and the cylinder at a point therein remote from the exhaust valve, valve means for controlling said communicating connection, and means for operating the valve means to extract some of the fuel-air mixture from the cylinder and return it to said chamber, said last means comprising a cam controlled by the position of the piston in the cylinder for operating the valve means during a portion of the movement of the piston in its compression direction after closing of the exhaust valve whereby movement of the piston forces a part of the fuel-air mixture in the cylinder to return to said chamber, and means manually operable during operation of the engine for varying the time of closing of the valve means in relation to the position of the piston to vary the amount of the fuel-air mixture extracted from the cylinder during each cycle of operation of the engine.

ALLEN M. ROSSMAN.